Feb. 23, 1937. H. W. LORMOR 2,071,469
STORAGE BATTERY
Filed Dec. 13, 1932 3 Sheets-Sheet 1

INVENTOR:
HENRY W. LORMOR
Kwis Hudson & Kent
ATTORNEYS

Feb. 23, 1937.    H. W. LORMOR    2,071,469
STORAGE BATTERY
Filed Dec. 13, 1932    3 Sheets-Sheet 2
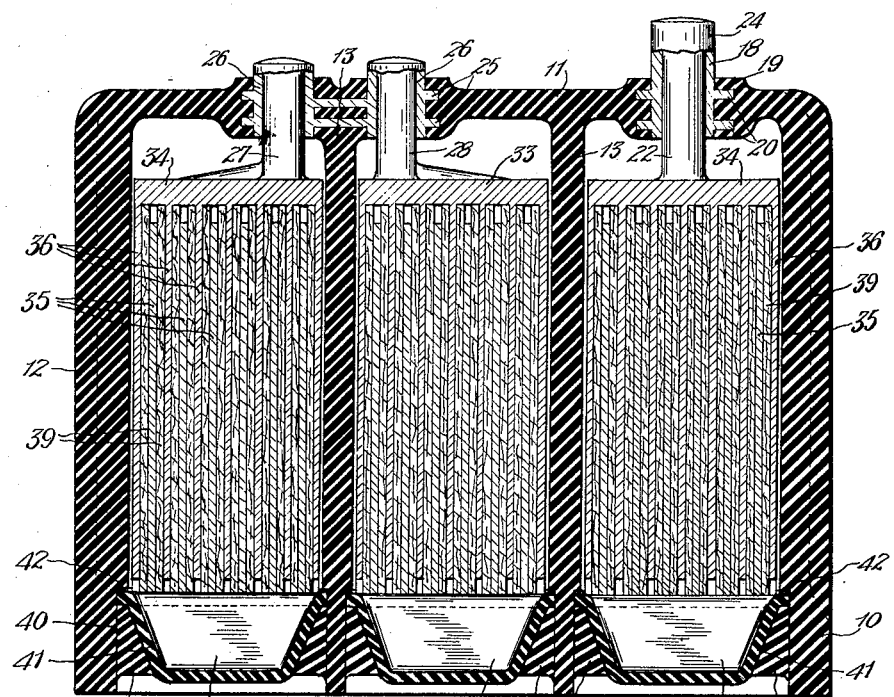
FIG. 3
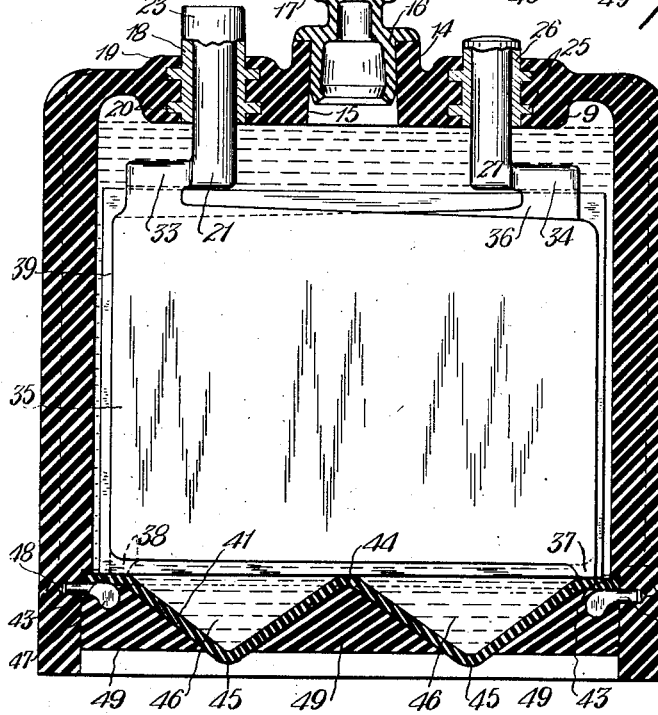
FIG. 4
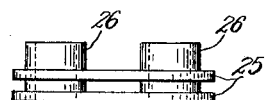
FIG. 5
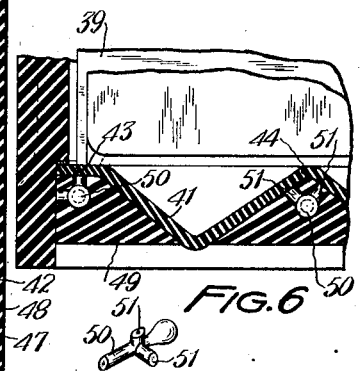
FIG. 6
FIG. 7
INVENTOR.
HENRY W. LORMOR
ATTORNEYS

INVENTOR:
HENRY W. LORMOR
ATTORNEYS

Patented Feb. 23, 1937

2,071,469

UNITED STATES PATENT OFFICE 2,071,469

STORAGE BATTERY

Henry W. Lormor, Cleveland Heights, Ohio, assignor to Willard Storage Battery Company, Cleveland, Ohio, a corporation of West Virginia Application December 13, 1932, Serial No. 646,950

23 Claims. (Cl. 136—166)

This invention relates to improvements in storage batteries, and has to do particularly with containers for batteries of the lead cell type, and to the mounting of the battery elements in the containers.

In lead cell batteries as heretofore constructed the containers have been built as jars with bottom and side walls, and with a top closure or cover which is sealed to the jar after the battery elements are assembled therein. As the usual thing there is a separate cover for each cell of a multiple cell battery. The covers are set into recesses formed in the upper end of the jar, and then sealing compound is flowed into the space above the covers to seal the joints. The top of the battery, when built in this manner, does not have as finished or workmanlike an appearance as could be desired, and the sealing compound which covers everything except the main and division walls of the battery, the posts, the connectors and the vent plugs is more susceptible to marring by physical and chemical action than is the material from which the jar itself is constructed. The spaces surrounded by the walls of the jar are also more or less depressed, and therefore tend to collect dirt and to retain any liquids which may be deposited thereon, particularly electrolyte.

The invention aims to overcome the above difficulties by turning the battery box or jar upside down so to speak and putting the closure or closures on the bottom.

One of the objects of the invention is the provision of a storage battery container having a solid molded top wall devoid of pockets or low surfaces that could collect foreign material or liquids, and adapted to shed any liquid which may be deposited upon it.

Another object is the provision of a storage battery container which shall present a good appearance.

Another object is the provision of a storage battery having novel means for the support of the battery elements.

Still another object is the provision of novel closures for the battery cells.

A further object is the provision of novel means for connecting the positive and negative posts of battery elements in adjacent cells.

Other objects and features of novelty will appear as I proceed with the description of that embodiment of the invention which, for the purposes of the present application, I have illustrated in the accompanying drawings, in which Figure 1 is a top plan view of a storage battery embodying the invention.

Fig. 3 is a longitudinal vertical sectional view of the battery taken substantially on the line 3—3 of Fig. 1.

Fig. 4 is a transverse vertical sectional view taken substantially on the line 4—4 of Fig. 1.

Fig. 5 is a detail elevational view of one of the intercell connectors.

Fig. 6 is a fragmental vertical sectional view of a modification.

Fig. 7 is a perspective view of the closure supporting pin employed in Fig. 6.

Figure 9:
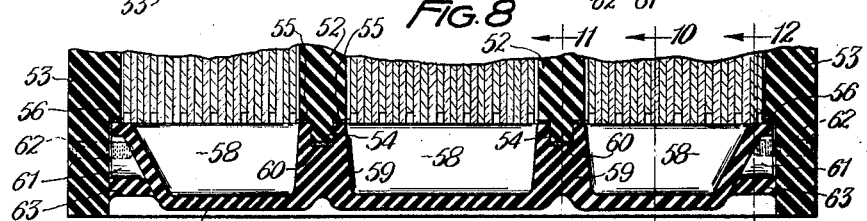
Figure 10:
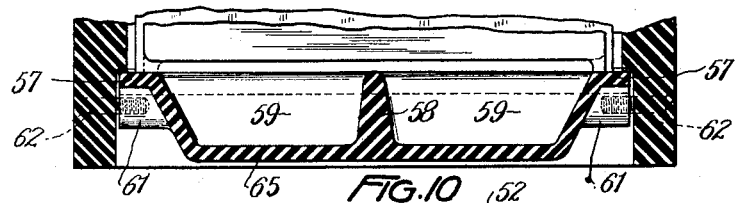
Figure 11:
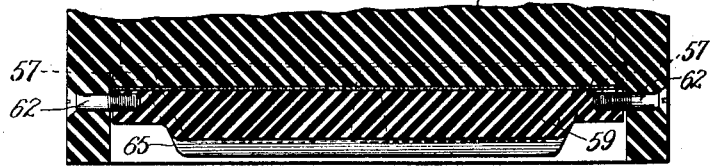
Figure 12:
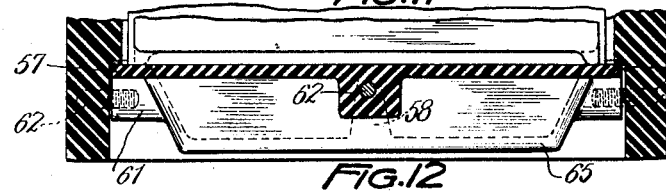

Fig. 9 is a fragmental vertical sectional view of a completely assembled battery, the view being taken substantially on the line 9—9 of Fig. 8, and Figs. 10, 11, and 12 are fragmental transverse sectional views taken substantially on the lines 10—10, 11—11, and 12—12 respectively of Fig. 9.

Referring first to that form of the invention which is illustrated in Figs. 1 to 5 inclusive, 10 indicates a container which is in effect an inverted jar. It has a top wall 11, four side walls 12, and may have one or more partition walls 13 in order to divide the container into two or more cell compartments. As shown in the drawings, the outer wall of the container is ornamented with vertical corrugations, but it is to be understood that this is merely by way of illustration. The upper corners may be rounded as shown, and in general this type of container lends itself well to a variety of designs having an esthetic appeal. The top wall 11 may be perfectly flat, or it may have a slight slope toward the edges in order to more readily shed any liquid that may be deposited upon it. One of the annoying difficulties with conventional batteries is the collection of sulphate upon and around the cable terminals which are attached to the terminal posts of the battery. This results of course from the action of the battery acid upon the metal of the terminals. In order to overcome this difficulty to as great an extent as possible, the slope in the top wall of my battery should be away from the terminal posts. One way of accomplishing this result is to provide a slight slope in the top wall away from a water shed or high elevation line A, see Fig. 1.

The top wall 11 of the container is provided with bosses 14 through which are formed openings 15 for the reception of vent plugs. In the present instance these openings are tapered somewhat in order to receive tapered soft rubber plugs 16 having dimensions such that they will form a good frictional contact with the walls of the openings, these plugs being hollow and each of them having a small perforation 17 therethrough to serve as a vent opening.

Hollow metallic inserts 18 are molded into bosses 19 of the top wall, one above each of the two end cell compartments. These inserts preferably each have a pair of annular flanges 20 which serve as anchors for the inserts. These inserts receive the positive and negative terminal posts 21 and 22 respectively of the battery. Burned joints 23 and 24 make a good mechanical as well as a good electrical connection between the posts and the inserts.

The positive plates of one cell may be connected to the negative plates of the adjacent cell by the usual or conventional connector outside of the battery case, but I prefer to use a novel type of connector which is molded into the top wall of the container when the latter is built, and the only portions of which that show above the surface of the container are the upper ends of sleeves surrounding the posts. In Fig. 5 I have shown such a connector. In this case it is a unitary lead or lead alloy casting comprising a pair of spaced plates 25 which merge into two sleeves 26. These connectors are embedded into thickened portions 9 of the top wall of the container, which portions extend across the partition walls 13.

The sleeves 26 of the connectors are adapted to receive posts of opposite polarity on the battery elements in two adjacent cells, as for instance the posts 27 and 28 in one pair and the posts 29 and 30 in the other. Each of these posts is joined to its connector sleeve 26 by a burned joint, as indicated in Figs. 3 and 4 of the drawings, which provides a good mechanical connection as well as a good electrical connection.

To each of the positive posts 21, 28, and 30 there is attached a strap 33, and to each of the negative posts 27, 29, and 22 there is attached a strap 34. The positive straps 33 carry positive plates 35, and the negative straps 34 carry negative plates 36. Each of the positive plates 35 has a foot 37 on its lower corner remote from the strap 33, while each of the negative plates 36 has a foot 38 on its lower corner remote from the strap 34. Separators 39 are interposed between adjacent plates of opposite polarity.

At the bottom of each cell compartment the outer walls 12 and the inner walls or partitions 13 are rabbeted upwardly, as at 40. Cell closures 41 of molded hard rubber or the like are inserted upwardly into the cells and are caused to seat against the shoulders formed at the upper ends of the rabbets 40, preferably with gaskets 42 interposed between the seats and the closures. Instead of using gaskets however, I may coat the upper edges of the cell closures 41 with sealing compound, which may also be placed upon the shoulders at the upper ends of the rabbets 40, this compound serving to effectively seal the joints between the closures and the container. These closures at their ends have ledges 43. Intermediate their ends they each have a transverse ridge 44, while intermediate the ridge 44 and each of the ledges 43 there is a transverse valley 45 whereby two sediment collecting pockets 46 are provided. The upper surfaces of the ledges 43 and ridge 44 are in the same plane. The separators 39 rest upon all three of these surfaces when the battery is assembled. The feet 37 and 38 on the plates 35 and 36 respectively rest upon the ledges 43. The major portion of each plate therefore is spaced above the ledges and the ridge 44 and above the bottom edges of adjacent separators. Hence the electrical path between any foot 37 or 38 and the nearest portion of an adjacent plate of opposite polarity is made longer than the thickness of the interposed separator.

Figure 1:
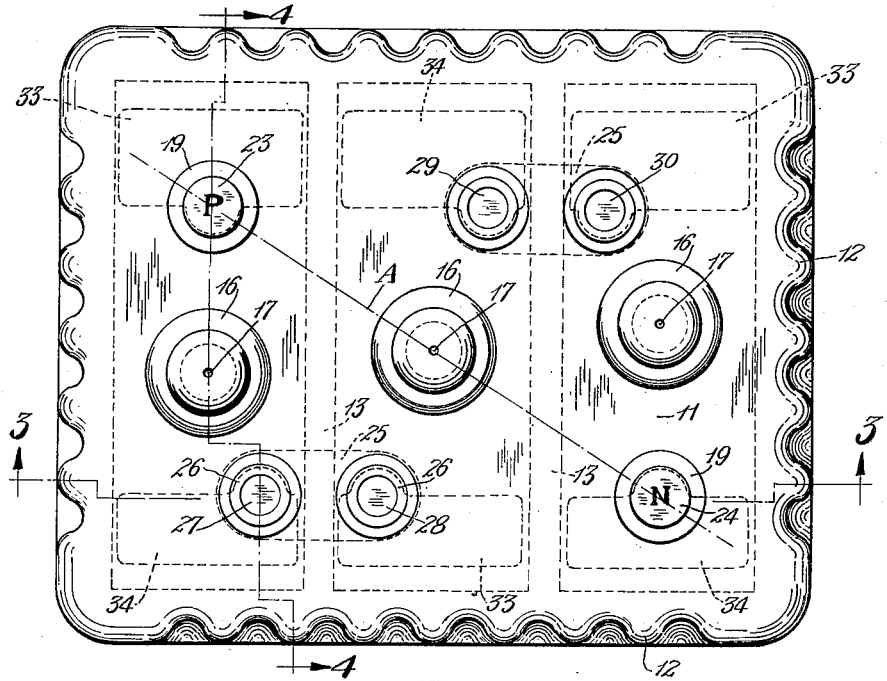
Figure 2:
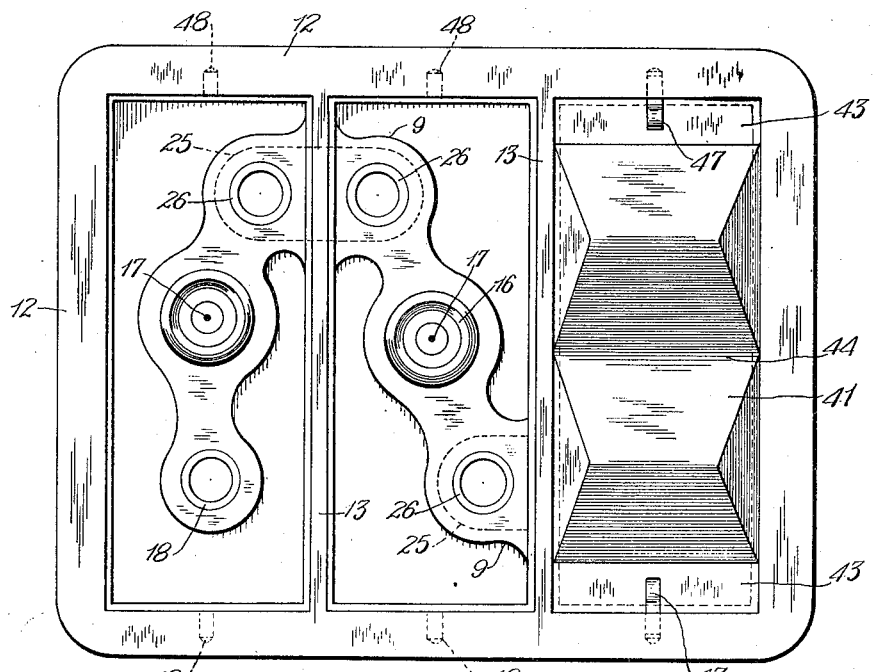
Fig. 2 is a bottom plan view of the same, two of the cells being shown with the closures and battery elements removed.
Figure 8:
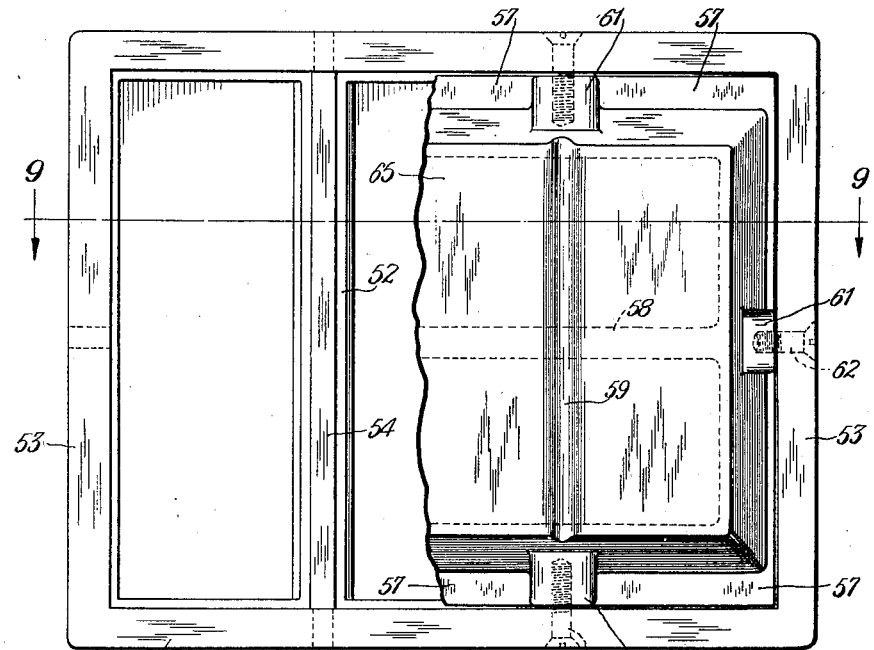
Fig. 8 is a bottom plan view of a modified form of the invention, wherein a one-piece closure is employed, a part of the closure being broken away to more clearly illustrate the invention.

Owing to the fact that a considerable portion of the load imposed by the weight of the battery element in a given cell must be supported upon the bottom closure 41, these closures must be securely mounted upon the container walls. For this purpose I may employ pins 47 set into holes 48 formed in the inner walls of the container at the ends of the cell, as indicated in Figs. 2 and 4. These pins are, of course, inserted into their holes after the closure is in position, and when the cell is to be taken down for repair or inspection the pins can be removed in order to permit the removal of the closure 41. When the parts are being assembled, the closure 41 is pushed into position and the pins 47 are next placed in the holes 48. The battery is then inverted and sealing compound 49 is flowed into position to seal all of the joints between the closure and the cell walls. It will be noted that both the sealing compound and the valleys 45 of the closure are protected by the fact that they are inset with respect to the lower edges of the container walls.

In Figs. 6 and 7 I have illustrated a modified form of pin 50 which may be substituted for the pin 47. Each of the pins 50 is provided with a pair of short diverging arms 51. These pins, instead of entering the end walls of the cell as do the pins 47, enter the side walls of the cell, and there are two of them at each end of the cell. I may also employ two such pins under the ridge 44, as indicated in the drawings. When these pins are used at the end of the cell, one of the arms 51 of each pin is caused to engage the lower surface of ledge 43, and the other arm is caused to engage the adjacent wall of the container. When they are used under the ridge 44 both of the arms engage the closure on opposite sides of the ridge. On account of the arms 51 being surrounded by sealing compound the dislodgement of the pins during the use of the battery is made extremely unlikely.

In Figs. 8 to 12 inclusive I have illustrated the lower end of a battery embodying the invention, wherein a one-piece bottom closure is employed for all three cells of the battery. In these figures the sealing compound is shown only in Fig. 9, being omitted for the sake of clearness in Figs. 8, 10, 11, and 12.

The container in this form of the invention may be identical with that of the previously described form, except that the partition walls 52 do not extend down to the level of the exterior walls 53. They are each supplied with a central depending rib 54, upon either side of which are shoulders 55 in the same horizontal plane with shoulders 56 on the main or outer walls of the container.

The one-piece closure 65 for the lower end of the container may be, and preferably is, an article molded from some insulating material, such as for instance as hard rubber. At its upper edges it is formed substantially like the individual closures 41 heretofore described, and comprises ledges 57 which are substantially like the ledges 43 of the previously described form, and serve the same purpose. It also comprises a central rib 58 dividing the space beneath each cell into two equal parts which serve as sediment collecting pockets. This rib 58 has the same function substantially as the ridge 44 in the first form of the invention. At right angles to the rib 58 there are two partition walls 59 adapted to align with and form continuations of the partition walls 52. Each of these walls 59 has a channel 60 therein extending throughout its length and adapted to receive the rib 54 at the bottom of the corresponding wall 52. Before the closure is put in place the lower ends of the walls 52 are coated with sealing compound, as are also the shoulders 56. When this compound is partially set the closure is forced into place, whereby a good seal is effected between the various cells.

On the outer walls of the closure preferably in alignment with the rib 58 and with the partition walls 59 there are integral bosses 61 in which are formed threaded openings for the reception of screws 62 of Monel metal or other suitable material, which extend through openings formed in the outer walls 53 of the container. The closure is well supported thereby. When the parts are assembled the container is inverted and sealing compound 63 is flowed into the joints around the closure to effectively seal the same and prevent leakage of electrolyte.

When a battery of either heretofore described form is to be assembled, the container is preferably laid upon its side. The battery elements each comprise a group of positive plates to which is connected a strap and post and a group of negative plates likewise connected to a strap and post, the plates of one group being interleaved with those of the other group, and separators being interposed between adjacent plates of opposite polarity. These assembled elements are slid into the proper cells, and their posts are caused to project through the inserts in the top wall of the battery. The closures 41, or the single closure 65, as the case may be, are then mounted as heretofore explained, after which the battery is inverted and the sealing compound flowed into position to seal the joints around the closure. The compound is then permitted to harden, after which the battery is turned right-side up. Both posts of each cell are then joined to their respective inserts by lead burning, the posts being built up in lead burning forms if desired, this being particularly desirable in the case of the terminal posts. When the burning is completed the physical union between the posts and the insert will serve to assist considerably in supporting the battery elements. That is to say, each group of plates will be hung at one upper corner by its post, and the feet at its opposite lower corner will rest upon a ledge of the bottom closure. The cells of the battery may then be filled with electrolyte through the openings 15, after which the vent plugs 16 may be inserted to close said openings. The battery will then be in readiness to receive its charge.

In the foregoing description I have necessarily gone somewhat into detail in order to explain fully the particular embodiments of the invention herein illustrated, but I desire it to be understood that such detail disclosures are not to be construed as amounting to limitations, except as they may be included in the appended claims.

Having thus described my invention, I claim:

1. In a storage battery of the lead-acid type, a container which when the battery is in its operative position comprises a cell compartment having integral top and side walls, said top having a vent opening therein, a battery element in said cell, and an imperforate bottom closure for the said compartment set into the lower end of the same above the bottom edges of the walls thereof, said closure being adapted to support the battery element and means for sealing the joints between the closure and the cell walls.

2. In a multi-cell storage battery of the lead-acid type, a container having integral top and side walls, said top having vent openings for the respective cells, a partition wall integral with the top and side walls separating adjacent cells, and imperforate closure means for the bottom ends of the cells, said closure means being set into the lower end of the container, and means for sealing said closure means to the side walls of the container and to the said partition, whereby each cell is sealed against leakage to or from an adjacent cell.

3. In a storage battery of the lead-acid type, a container which when the battery is in its operative position has integral top and side walls and an imperforate bottom closure, said container having a vent opening and post openings in its top wall, a battery element in the container comprising posts extending into said openings, and means for mechanically connecting said posts to said container, said closure engaging the lower end of the battery element for the purpose of assisting in its support.

4. In a storage battery of the lead-acid type, a container having integral top and side walls and an imperforate bottom closure, said container having a vent opening and post openings in its top wall, hollow metallic inserts mounted in the container concentric with said openings, a battery element including posts extending into said inserts, and burned joints connecting said inserts and posts, whereby the posts are connected to the inserts both mechanically and electrically, said closure engaging the lower end of the battery element for the purpose of assisting in its support.

5. In a storage battery of the lead-acid type, a multi-cell container rectangular in form having a top wall and four side walls all made integral, and having a separable imperforate bottom closure, said top wall having a rounded perimeter adapted to shed any liquid deposited upon the top.

6. In a storage battery of the lead-acid type, a multi-cell container rectangular in form having a top wall and four side walls all made integral, said container having a vent opening and post openings in its top wall, and having a separable imperforate bottom closure, said top wall having upwardly extending bosses surrounding each of said openings and having a rounded perimeter adapted to shed any liquid deposited upon the top.

7. In a storage battery of the lead-acid type, a container having a top, a bottom and side walls, said container comprising a cell compartment, a battery element adapted to fit into said compartment, a pair of ledges formed on the bottom of the cell at opposite ends thereof, said element including two groups of plates, the plates of each group being interleaved with those of the other group and being connected at their upper ends by a strap, a post extending upwardly from each strap, means for supporting the said posts in the top wall of the container, each plate having a foot at its lower corner most remote from its strap connection, said foot extending downwardly below the rest of the plate and being adapted to rest upon one of said ledges, and separators arranged between adjacent plates and extending downwardly to the level of the lower edges of said feet, whereby the electrical path between one foot and the plate next to it is longer than the thickness of a separator.

8. In a storage battery of the lead-acid type, a container having integral top and side walls, said container comprising a cell having a bottom opening with dimensions at least as great as the internal dimensions of the cell, a battery element adapted to be inserted into the cell through said bottom opening, said element comprising positive and negative posts, the top wall of the container having openings therethrough for the reception of said posts, and having also a vent opening, an imperforate bottom closure for said cell, means upon said bottom closure for supporting the said battery element, and means for securing said closure to said container and sealing the joints therebetween.

9. In a storage battery of the lead-acid type, a container having integral top and side walls, partition walls for dividing the interior of the container into a plurality of cells, the bottom of the container being open, a battery element for each of said cells adapted to be inserted into the cell through the bottom thereof, each of said elements having upwardly projecting positive and negative posts, the top wall of the container having openings therethrough for the reception of said posts and having also a vent opening, and means for completely closing and sealing the bottom openings of all of said cells, said closing means being adapted to support said battery elements.

10. In a storage battery of the lead-acid type, a container having integral top and side walls, partition walls for dividing the interior of the container into a plurality of cells, the bottom of the container being open, a battery element for each of said cells adapted to be inserted into the cell through the bottom thereof, each of said elements comprising two groups of plates interleaved, the plates of each group being connected by a strap and each strap having a post attached thereto and extending upwardly therefrom, the top wall of the container having openings therethrough for the reception of said posts and having also a vent opening, and means for completely closing and sealing the bottom openings of all of said cells, said closing means being adapted to support said battery elements.

11. In a storage battery of the lead-acid type, a container having integral top and side walls, partition walls for dividing the interior of the container into a plurality of cells, the bottom of the container being open, a battery element for each of said cells adapted to be inserted into the cell through the bottom thereof, each of said elements comprising two groups of plates interleaved, the plates of each group being connected by a strap and each strap having a post attached thereto and extending upwardly therefrom, the top wall of the container having openings therethrough for the reception of said posts and for the venting of the respective cells, means for attaching said posts to the top wall of the container mechanically as well as electrically, and means for completely closing and sealing the bottom openings of all of said cells, said closing means being adapted to support said battery elements.

12. In a storage battery of the lead-acid type, a container having integral top and side walls, said container comprising a cell having a bottom opening with dimensions at least as great as the internal dimensions of the cell, a battery element adapted to be inserted into the cell through said bottom opening, said element comprising positive and negative posts, the top wall of the container having openings therethrough for the reception of said posts, and for the venting of the respective cells, an imperforate bottom closure for said cell, said closure having a pocket therein for the reception and collection of sediment, and means for securing said closure to said container and sealing the joints therebetween, said closure comprising means adapted to engage and support the battery element.

13. In a storage battery of the lead-acid type, a container which when the battery is in its operative position comprises a cell compartment having integral top and side walls, said top having a vent opening therethrough, said walls being rabbeted upwardly on their inner sides to provide a downwardly facing closure seat, an imperforate closure engaging said seat, a battery element resting upon said closure, removably closure supporting means projecting inwardly from said cell walls engaging the closure to hold it in place, and means for sealing the joints between the closure and the cell walls.

14. In a storage battery of the lead-acid type, a container comprising a cell compartment having integral top and side walls and being open at its lower end, a battery element comprising positive and negative plates, said element being adapted to be inserted into said cell through its open lower end, said element having positive and negative posts projecting upwardly into openings provided in the top wall of the cell, an imperforate closure for the lower end of the cell, said closure having end ledges and a central rib on its upper side, and having sediment collecting pockets between the said rib and each of said ledges, the plates of said element having feet adapted to rest upon said ledges, means for securing the closure to the cell walls, and means for sealing the joints between said closure and said cell walls.

15. In a storage battery of the lead cell type, a container comprising a cell compartment having integral top and side walls and being open at its lower end, a battery element comprising interleaved groups of positive and negative plates with separators interposed between adjacent plates, said battery element being adapted to be inserted into said cell through its open lower end, a closure for the lower end of the cell, means for supporting said closure, said closure having end ledges and a central rib all in the same horizontal plane, and having sediment collecting pockets between the said rib and each of said ledges, the plates of said element having feet adapted to rest upon said ledges, whereby the lower edges of the plates are spaced above said ledges and rib, said separators extending down to said ledges and rib, and means for sealing the joints between said closure and said cell walls.

16. In a storage battery of the lead-acid type, a container which when the battery is in its operative position comprises a cell compartment having integral top and side walls, the top wall being provided with a vent opening, a separate imperforate bottom closure for the said compartment secured to the lower end of the said container, and means for sealing the joints between the closure and the cell walls.

17. In a storage battery of the lead-acid type, a container which when the battery is in its operative position has integral top and side walls and an imperforate bottom closure, said container having a vent opening and post openings in its top wall, a battery element in the container comprising posts extending into said openings, and means for mechanically connecting said posts to said container, said closure engaging the lower end of the battery element.

18. In a storage battery of the lead-acid type, a container having integral vertical side walls and an integral horizontal wall, an imperforate detachable closure opposite said integral horizontal wall controlling access to the cells, said container having post openings in said integral horizontal wall, hollow metallic inserts mounted within said openings, a battery element including posts extending into said inserts, and burned joints connecting said inserts and posts, whereby the posts are connected to the inserts both mechanically and electrically.

19. In an electric storage battery the combination of a box having a plurality of chambers or cells and having an integral wall structure comprising a wall portion separating adjoining cells and a wall portion of the box serving also as an end wall for the cells, the end wall portions of the cells having openings therethrough, said openings being so positioned that movement of unitary groups of storage plates comprising terminal studs, into such cells will bring the studs into such openings, a connector extending between two of said openings for making fusible connection at its opposite ends with studs of separate unitary groups of storage plates in adjoining cells and thereby sealing the openings, and a unitary group of positive and negative plates for each cell, the groups or units having at one end thereof studs for entry into corresponding openings in the cell walls incident to insertion of the units into the cells, said studs being fusible through said openings with the connector disposed at such openings, the ends of each unitary group of plates opposite said studs being free of obstruction whereby to permit of insertion and removal of separators between adjacent plates without disturbing the fused connections between the studs and the connector.

20. A storage battery of the wet cell type consisting of a plurality of cells each comprising positive plates, negative plates, separators disposed between the plates, and means for securing the plates and separators of each cell in individual units, a battery box comprising integral walls defining the cells with the exception of one end of each cell, and connectors molded in said integral walls and electrically connecting the plates in the several cells and to which connectors the plates have rigid physical connection, a detachable closure member for each cell controlling access to the cells in such relation to the unit in each cell as will permit removal and insertion of separators without disturbing the mountings or attachment of the plates to the connectors molded in the box.

21. A storage battery container comprising a multiplicity of cell chambers and having inter-cell connectors molded in the end of the container opposite the end from which the plate and separator elements are inserted.

22. A storage battery comprising a box having its side walls integral with its top, a plate unit comprising positive and negative elements and separators between said elements, the elements of like polarity being connected together adjacent the top of the box and including a stem fixed to the top and having an electricity conducting connection extending through the top, the joinder of the elements limiting movement of the separators toward the top, and a removable bottom for the box controlling access to the separators, the separators being removable and renewable through the bottom of the box, upon removal of the bottom from the box, said unit of plates and separators being mountable in the box in an assembled relation.

23. In an electric storage battery the combination of a box having a plurality of chambers or cells and having an integral wall structure comprising a wall portion separating adjoining cells and a wall portion of the box serving also as an end wall for the cells, the end wall portions of the cells having openings therethrough, said openings being so positioned that movement of unitary groups of storage plates comprising terminal studs, into such cells will bring the studs into such openings, a connector extending between two of said openings for making fusible connection at its opposite ends with studs of separate unitary groups of storage plates in adjoining cells and thereby sealing the openings, and a unitary group of positive and negative plates for each cell, the groups or units having at one end thereof studs for entry into corresponding openings in the cell walls incident to insertion of the units into the cells, said studs being fusible through said openings with the connector disposed at such openings, the ends of each unitary group of plates opposite said studs being free of obstructions whereby to permit of insertion and removal of separators between adjacent plates without disturbing the fused connections between the studs and the connector, the end walls of the cells being so constructed and related to the unitary group of plates in such cells as will in normal operation of the battery, preclude short circuiting of the positive and negative plates by reason of a deposit of matter upon the bottom wall of the cells.

HENRY W. LORMOR.